United States Patent
Hermoni et al.

(10) Patent No.: US 11,271,948 B2
(45) Date of Patent: Mar. 8, 2022

(54) SYSTEM, METHOD, AND COMPUTER PROGRAM FOR VERIFYING VIRTUAL NETWORK FUNCTION (VNF) PACKAGE AND/OR NETWORK SERVICE DEFINITION INTEGRITY

(71) Applicant: Amdocs Development Limited, Limassol (CY)

(72) Inventors: Ofer Hermoni, Plano, TX (US); Gad Yitzhak Weissman, Hod Hasharon (IL); Liron Shtraichman, Petah Tikva (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 161 days.

(21) Appl. No.: 15/981,804

(22) Filed: May 16, 2018

(65) Prior Publication Data
US 2018/0337931 A1  Nov. 22, 2018

Related U.S. Application Data

(60) Provisional application No. 62/509,623, filed on May 22, 2017, provisional application No. 62/509,637, filed on May 22, 2017.

(51) Int. Cl.
*G06F 21/00* (2013.01)
*H04L 29/06* (2006.01)
(Continued)

(52) U.S. Cl.
CPC .......... *H04L 63/123* (2013.01); *G06F 16/955* (2019.01); *H04L 41/0823* (2013.01);
(Continued)

(58) Field of Classification Search
CPC .............. H04L 63/123; H04L 41/5051; H04L 41/0823; H04L 41/0896; G06F 16/955
See application file for complete search history.

(56) References Cited

U.S. PATENT DOCUMENTS 9,760,923 B1   9/2017  Felstaine et al.
2004/0249667 A1*  12/2004  Oon ...................... G06F 19/328
                                                                                        705/2
(Continued)

FOREIGN PATENT DOCUMENTS

| EP | 3107246 A1 | 12/2016 |
| EP | 3107248 A1 | 12/2016 |
| WO | 2016204903 A1 | 12/2016 |

OTHER PUBLICATIONS

Schwartz et al., U.S. Appl. No. 15/222,844, filed Jul. 28, 2016.
International Search Report and Written Opinion from PCT Application No. PCT/IB2018/053549, dated Aug. 13, 2018.

*Primary Examiner* — Anthony D Brown
*Assistant Examiner* — Rodman Alexander Mahmoudi
(74) *Attorney, Agent, or Firm* — Zilka-Kotab, P.C.

(57) ABSTRACT

A system, method, and computer program product are provided for verifying virtual network function (VNF) package and/or network service definition integrity. In use, a system identifies a virtual network function package or a network service definition for performing integrity verification. The system computes a unique identifier of the VNF package or the network service definition that allows verification of an integrity of the VNF package or the network service definition. The system stores the unique identifier in a blockchain or a shared database. The system provides the VNF package or the network service definition to an entity such that the entity is capable of verifying the integrity of the VNF package or the network service definition by using the
(Continued)

unique identifier of the VNF package or the network service definition from the blockchain or the shared database.

14 Claims, 14 Drawing Sheets

(51) Int. Cl.
| | |
|---|---|
| *H04L 41/5051* | (2022.01) |
| *H04L 67/51* | (2022.01) |
| *G06F 16/955* | (2019.01) |
| *H04L 41/0896* | (2022.01) |
| *H04L 43/08* | (2022.01) |
| *H04L 41/0823* | (2022.01) |
| *H04L 67/00* | (2022.01) |
| *H04L 43/50* | (2022.01) |
| *H04L 41/0893* | (2022.01) |
| *H04L 41/5006* | (2022.01) |
| *H04L 41/12* | (2022.01) |

(52) U.S. Cl.
CPC ...... *H04L 41/0896* (2013.01); *H04L 41/5051* (2013.01); *H04L 43/08* (2013.01); *H04L 63/0823* (2013.01); *H04L 67/16* (2013.01); *H04L 41/0893* (2013.01); *H04L 41/12* (2013.01); *H04L 41/5006* (2013.01); *H04L 43/50* (2013.01); *H04L 67/34* (2013.01)

(56) References Cited

U.S. PATENT DOCUMENTS

| | | | |
|---|---|---|---|
| 2015/0288541 A1* | 10/2015 | Fargano | H04L 67/1097 |
| | | | 709/225 |
| 2017/0373939 A1* | 12/2017 | Liu | G06F 16/951 |
| 2018/0026794 A1* | 1/2018 | Nakano | G06F 21/50 |
| | | | 713/176 |
| 2018/0108024 A1* | 4/2018 | Greco | H04L 9/3236 |
| 2018/0121635 A1* | 5/2018 | Tormasov | H04L 9/3297 |
| 2018/0227131 A1* | 8/2018 | Ebrahimi | G06Q 20/065 |
| 2018/0248699 A1* | 8/2018 | Andrade | H04L 9/0897 |
| 2019/0080084 A1* | 3/2019 | Zhang | H04L 41/064 |

* cited by examiner

US 11,271,948 B2

SYSTEM, METHOD, AND COMPUTER PROGRAM FOR VERIFYING VIRTUAL NETWORK FUNCTION (VNF) PACKAGE AND/OR NETWORK SERVICE DEFINITION INTEGRITY

CLAIM OF PRIORITY AND RELATED APPLICATIONS

This application claims the benefit of U.S. Provisional Application No. 62/509,623, filed May 22, 2017 and U.S. Provisional Application No. 62/509,637, May 22, 2017, the entire contents of each are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance.

Integrity of data assures that it has not been subject to unauthorized change. A VNF is a network function that runs in one or more virtual machines on top of the hardware networking infrastructure in a communication service provider (CSP) network. A VNF is developed and packaged by a VNF vendor and consumed by a communication service provider. In order to make sure that the VNF the CSP is using is genuine, the CSP needs to check the VNF integrity. However, current techniques for verifying VNF integrity are limited.

There is thus a need for addressing these and/or other issues associated with the prior art.

SUMMARY

A system, method, and computer program product are provided for verifying virtual network function (VNF) package and/or network service definition integrity. In use, a system identifies a virtual network function package or a network service definition for performing integrity verification. The system computes a unique identifier of the VNF package or the network service definition that allows verification of an integrity of the VNF package or the network service definition. The system stores the unique identifier in a blockchain or a shared database. The system provides the VNF package or the network service definition to an entity such that the entity is capable of verifying the integrity of the VNF package or the network service definition by using the unique identifier of the VNF package or the network service definition from the blockchain or the shared database.

DETAILED DESCRIPTION

Figure 1:
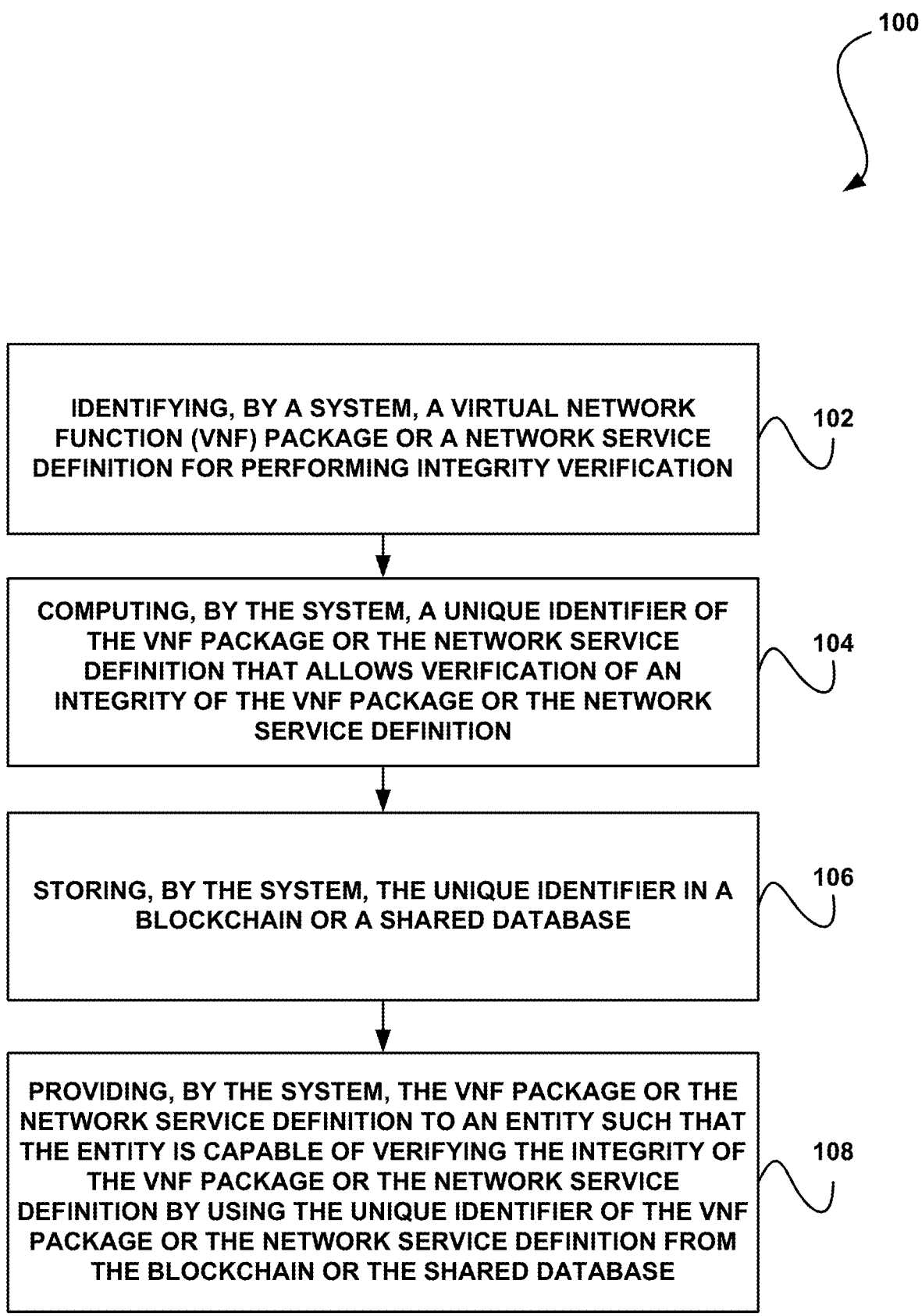
FIG. 1 illustrates a method for verifying virtual network function (VNF) package and/or network service definition integrity in a NFV-based communication network, in accordance with one embodiment.

FIG. 1 illustrates a method 100 for verifying virtual network function (VNF) package or network service definition integrity in an NFV-based communication network, in accordance with one embodiment.

In operation, a system identifies a virtual network function package or network service definition for performing integrity verification. See operation 102. The system computes a unique identifier (e.g., a checksum, a hash, a signature, etc.) of the VNF package or the network service definition that allows verification of an integrity of the VNF package or the network service definition. See operation 104. The system stores the unique identifier in a blockchain or a shared database. See operation 106.

The system provides the VNF package or the network service definition to an entity (e.g., a communication service provider (CSP), a system, a CSP system, etc.) such that the entity is capable of verifying the integrity of the VNF package or the network service definition by using the unique identifier of the VNF package or the network service definition from the blockchain or the shared database. See operation 108.

Figure 10:
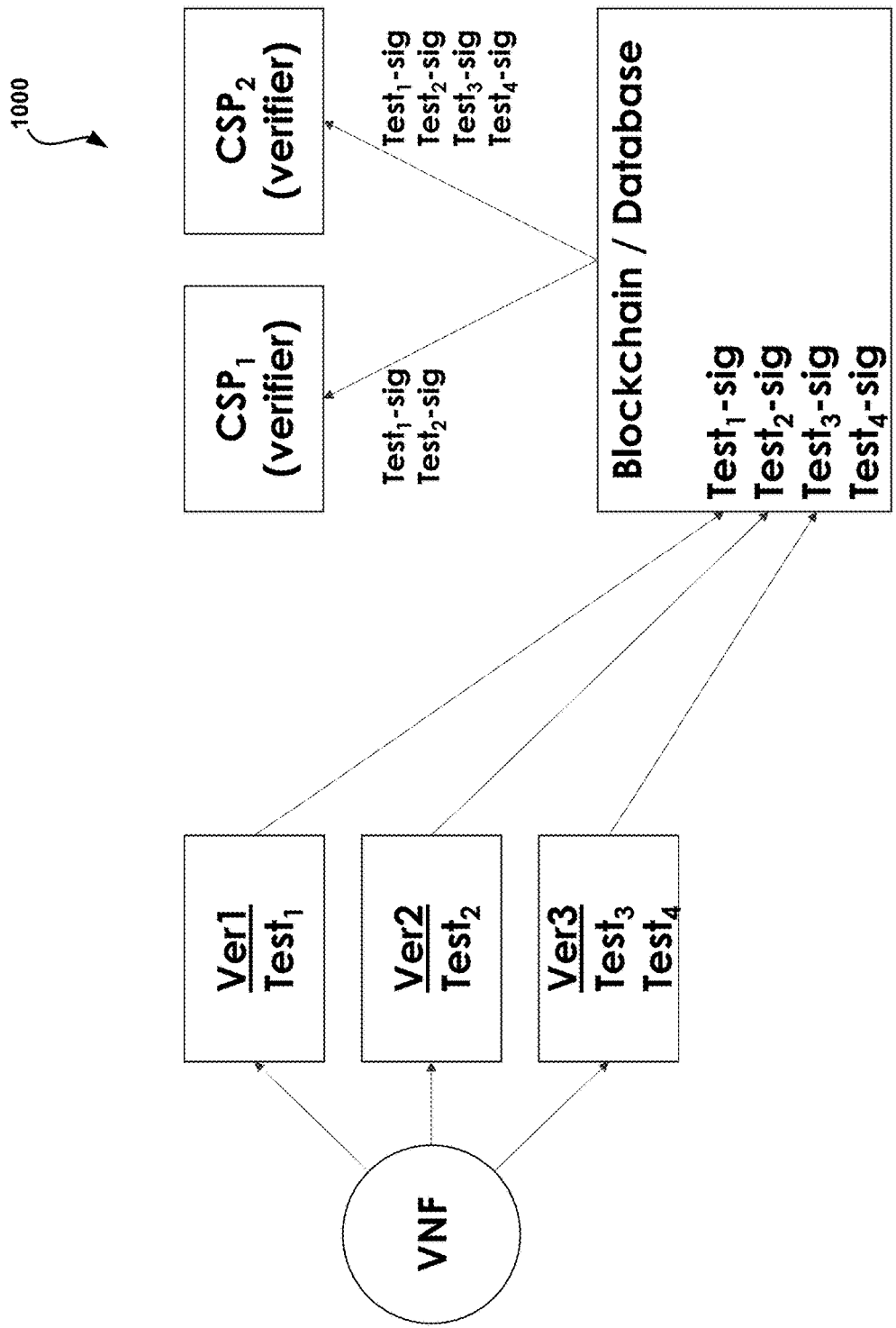
FIG. 10 illustrates a simplified block diagram of a system flow diagram for verifying the integrity of VNF and/or network services in which there are several different entities that are providing different levels of certifications/verification, in accordance with one embodiment.

It should be noted that the system may include one entity (e.g., a system executed by one company, etc.), or the system may include a plurality of entities (e.g., multiple systems executed by multiple companies, etc.), each dedicated to performing a portion of the integrity verification (e.g., as described in further detail in the context of FIG. 10, etc.).

Blockchain refers to a digitized, decentralized, public ledger containing crypto transactions, constantly growing as "completed" blocks (representing transactions) are recorded and added to it in chronological order.

The VNF package may be described in ETSI GS VNF SOL 004. The network service definition may include one or more VNFs and/or Physical Network Functions (PNFs), their interconnections, and chaining definitions, etc. Moreover, verified VNF packages may be utilized to build one or more network service definitions, which may in turn be verified utilizing the method 100.

Further, in one embodiment, a verified VNF package, resulting from the communication service provider verifying the integrity of the VNF package, may be added to a communication service provider (CSP) catalog. In this case, periodically or when that VNF package is going to be used (e.g., to build a network service, etc.), the system may verify that the VNF package in the CSP catalog is unchanged by verifying the hash of the VNF package in the blockchain or the shared database.

Similarly, a verified network service definition, resulting from the communication service provider verifying the integrity of the network service definition, may be added to a CSP catalog. In this case, periodically or when it is time to use the network service definition, an orchestrator may verify that the network service definition in the CSP catalog is unchanged by verifying the hash of the network service definition in the blockchain or the shared database (e.g., when the orchestrator receives a request to utilize the network service definition).

Additionally, the orchestrator may create a running network service utilizing the verified network service definition (e.g., to use in a production environment). In this case, the integrity of the running network service may also be verified. This may be implemented by: computing, by the orchestrator, a first unique identifier for a configuration representation associated with the running network service; storing, by the orchestrator, the first unique identifier in a blockchain or a database (e.g., which may be a blockchain or database different from that used in the method 100 or the same blockchain or database); computing, by the orchestrator, a second unique identifier for the running network service during production; comparing, by the orchestrator, the second unique identifier to the first unique identifier stored in the other blockchain or the other database; determining, by the orchestrator, whether the second unique identifier matches the first unique identifier; and generating, by the orchestrator, an alert for potential tampering of the running network service if the second unique identifier does not match the first unique identifier. More details regarding verifying running network services may be found in the description associated with FIG. 7, etc.

The orchestrator may update and store the first unique identifier if the running network service undergoes an approved change. The approved change may include, for example, one or more of migration, change of scaling, change of network address, change of location, change of functional configuration, and change of one or more policies, etc.

In the context of the present description, the terms "network" and "communication network" refer to the hardware and software connecting one or more communication elements including wireline networks, wireless networks, and/or combinations thereof.

The terms "network function virtualization" (NFV) and virtual network function (VNF) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breach or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breach or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for verifying virtual network function package and/or network service definition integrity according to various embodiments may be further understood with reference to the following drawings and accompanying description.

It should be noted that any techniques described herein with reference to VNF or VNF package verification, etc., may be applied to a network service definition.

Figure 2:
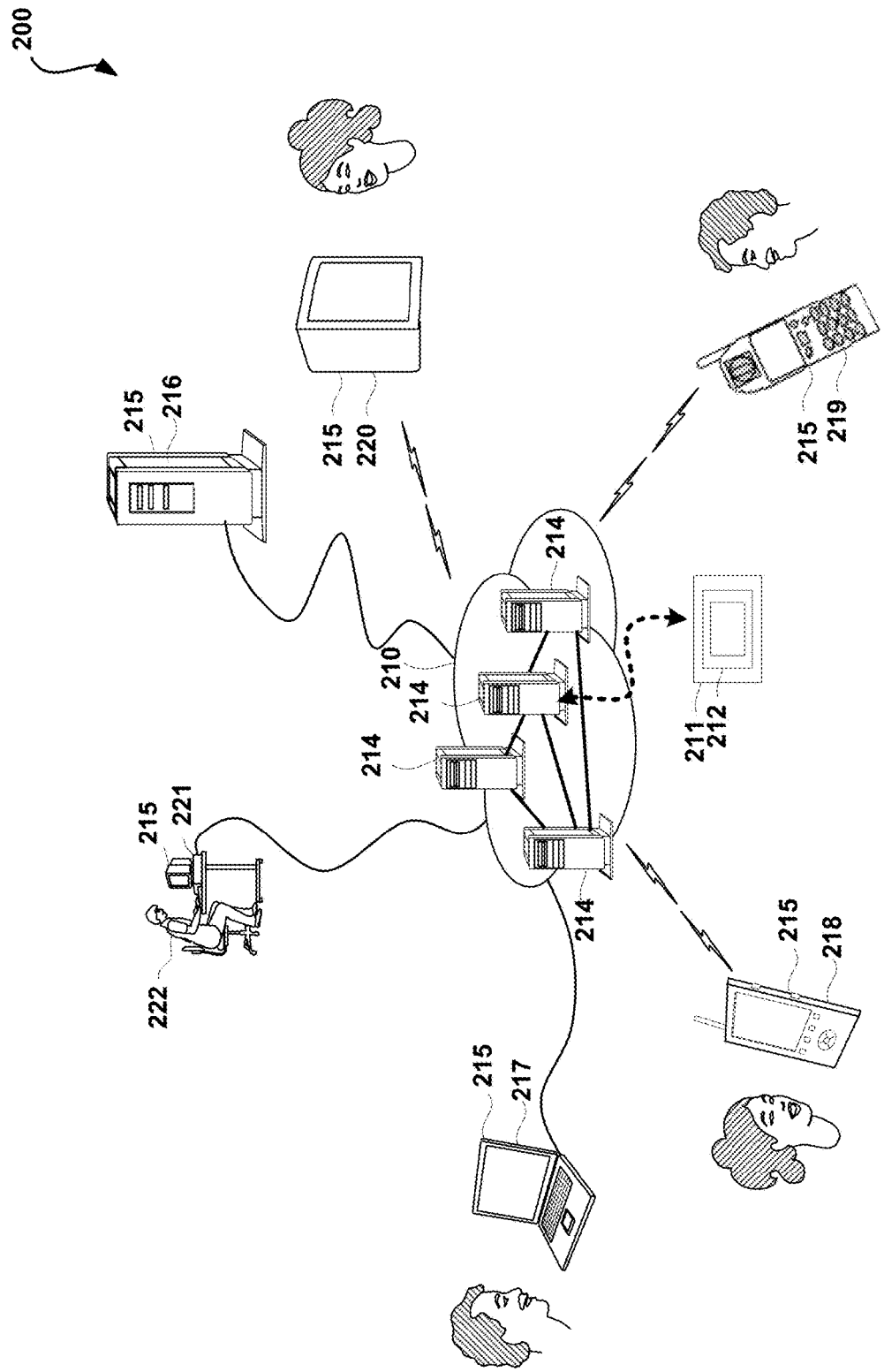
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 211, and an NFV-orchestration (NFV-O) module 212, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The NFV-O module 212 and the NFV management system 211 may be separate software programs provided by different vendors. In one embodiment, the NFV-based network 210 may even have a plurality of any of the NFV management systems 211, and the NFV-O modules 212.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.), etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, and the NFV-O 212.

Figure 3:
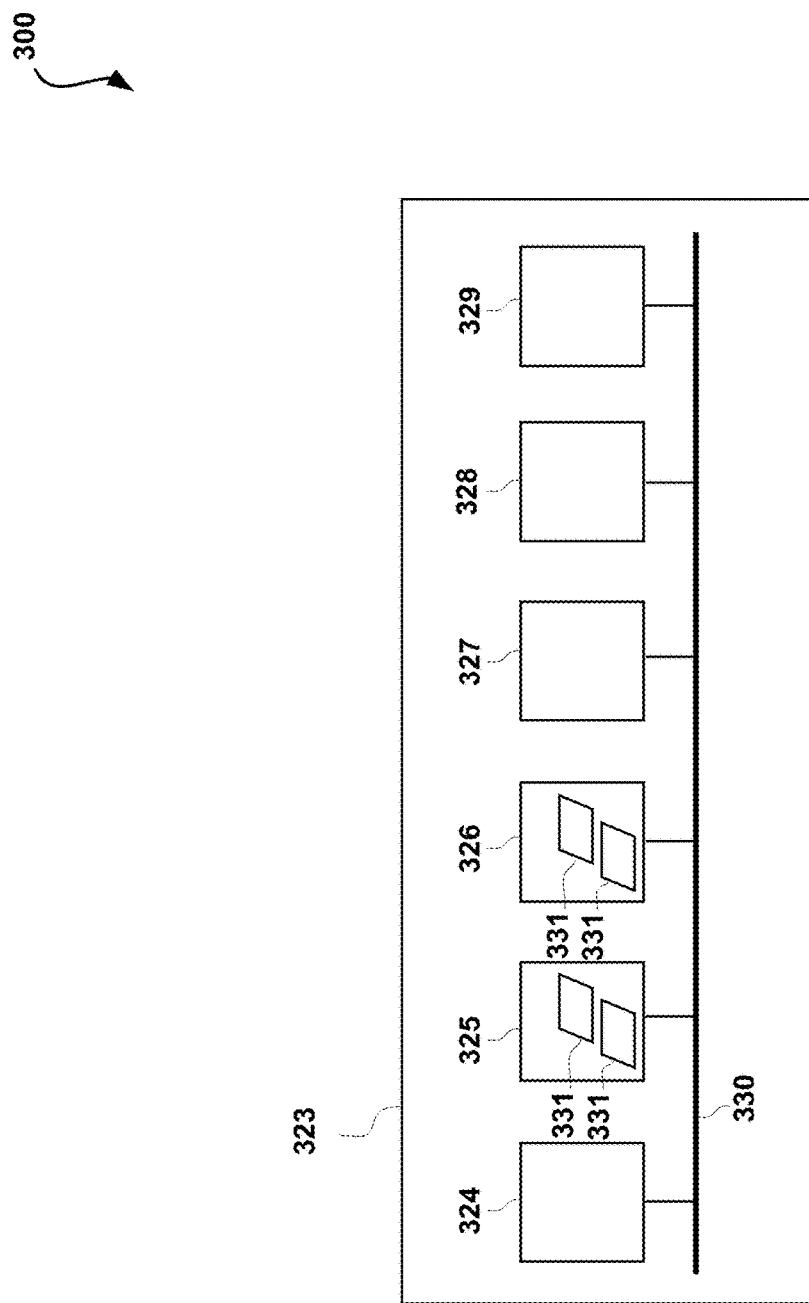
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, and the NFV-O 212.

Figure 4:
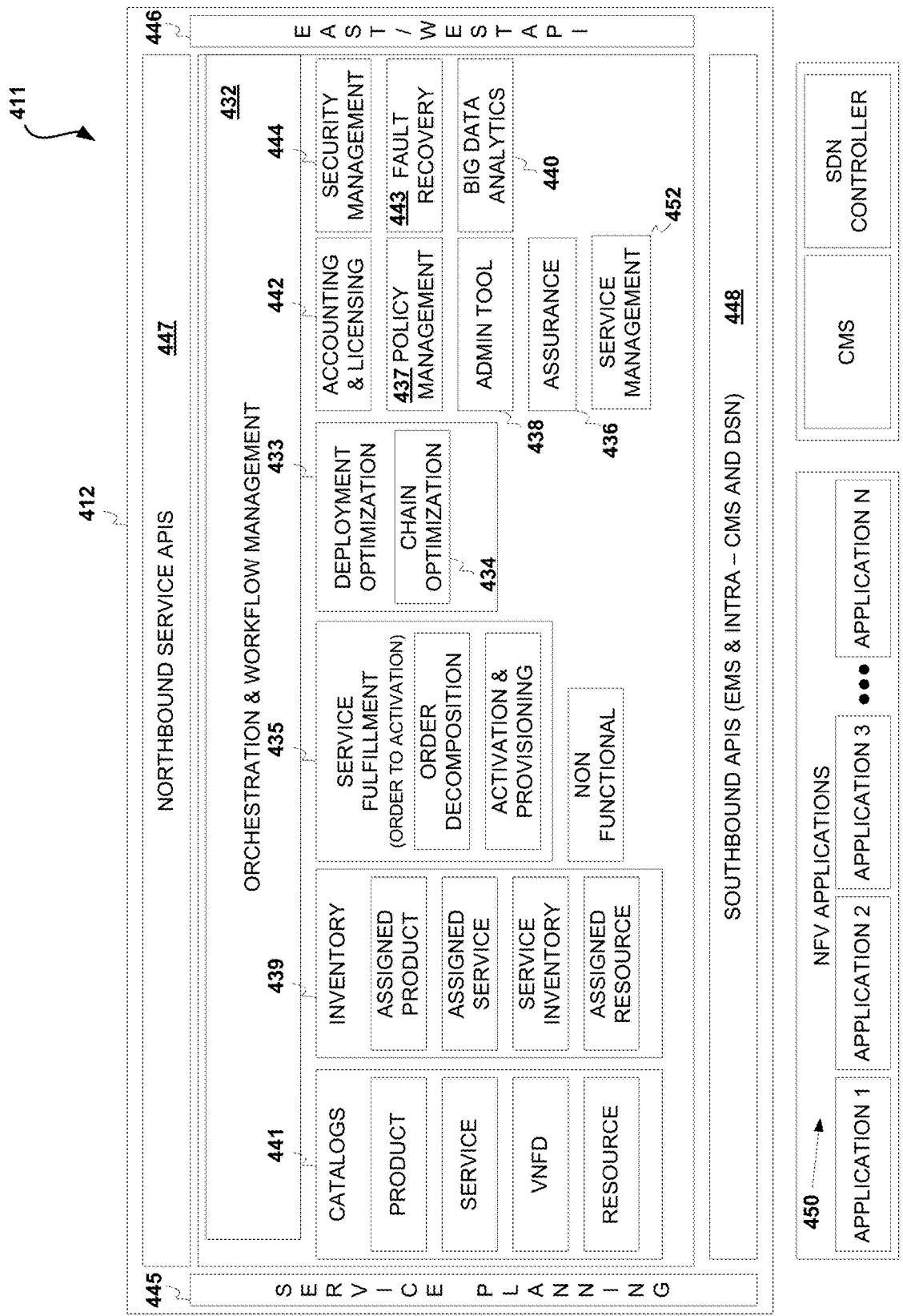
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfilment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfilment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
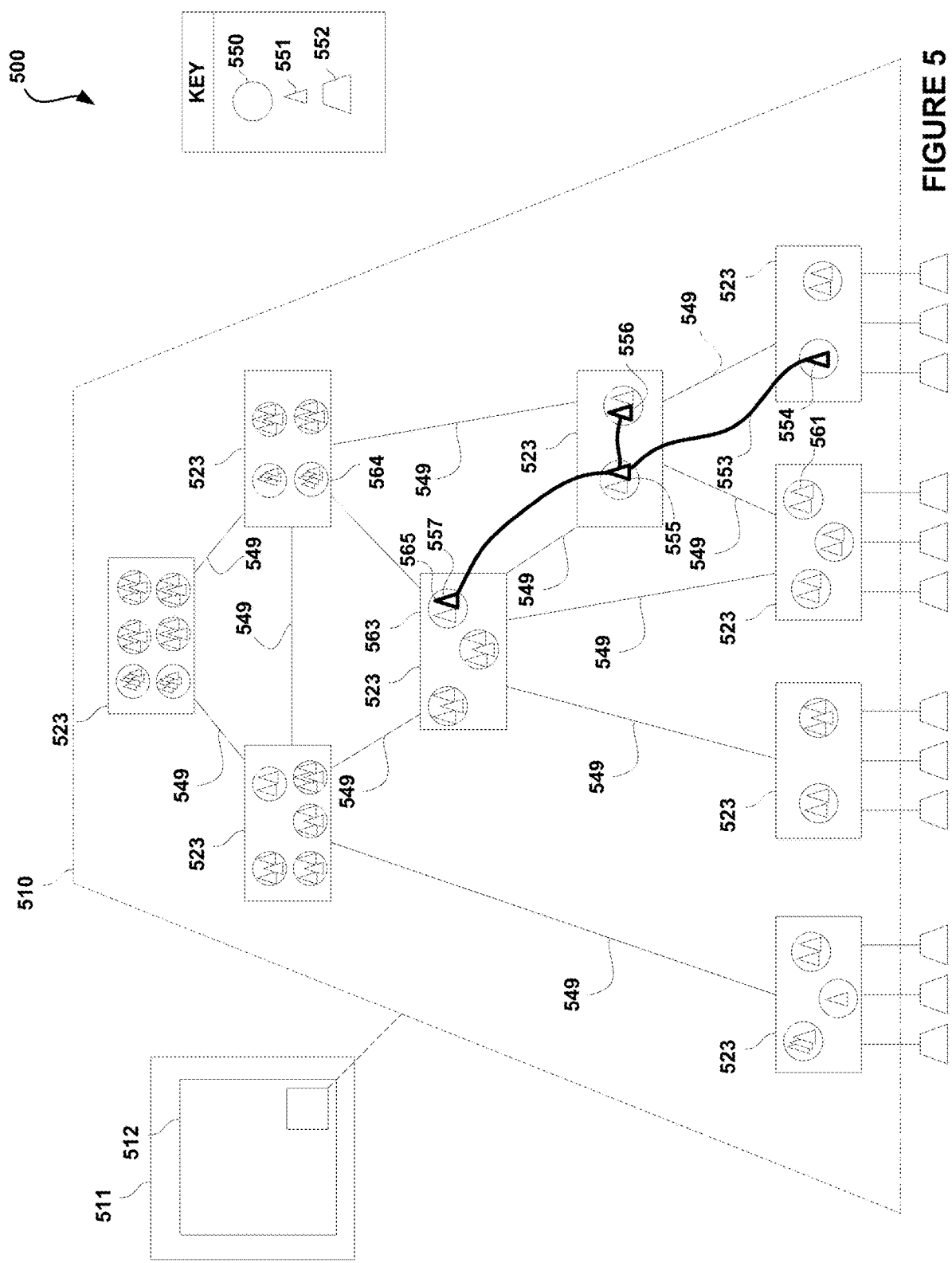
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, and an NFV-orchestration (NFV-O) 512 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for roll-back and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Integrity of data assures that it has not been subject to unauthorized change. One technique for achieving integrity is to compare a piece of data to a previously stored copy of the data and to identify any changes. Instead of comparing the full piece of data, it is possible to calculate a unique identifier of the data.

Multiple techniques exist to make this calculation, including utilizing a checksum or hash. In this case, the checksum or hash are stored in a separate repository. At any given time, a checksum or hash of the data can be calculated and compared to the value stored in the repository. If the calculated and the stored values are identical, then no unauthorized changes have been made to the data since the time at which the checksum or hash was stored in the repository. The repository in which the checksum or hash is stored may be comprised of different systems. One implementation uses various forms of databases. Another implementation uses a blockchain.

A VNF is a network function that runs in one or more virtual machines on top of the hardware networking infrastructure in a communication service provider (CSP) network. A VNF is developed and packaged by a VNF vendor and consumed by a communication service provider. In order to make sure that the VNF the CSP is using is genuine, the CSP needs to check the VNF integrity.

Relying on a central database as a repository comes with challenges, but foremost among them is the security threat of a hacking attack. As long as at least one set of credentials exists to the database, it is possible for an unauthorized user to change the repository's data, thereby rendering the integrity check vulnerable.

A blockchain is a distributed method for storing data. Via consensus, new data is stored immutably. With no single point of failure, tampering with data becomes exceedingly difficult. In the implementation described herein, a hash of a VNF package is signed, by an integrity verification system, into a blockchain (or in another type of repository that is database based) once accredited. When an entity (e.g., a CSP, etc.) seeks to use the VNF, the entity can verify the integrity of the VNF by polling the blockchain with the VNF's hash or checksum.

In general, a VNF package contains a VNF Descriptor file (e.g., in TOSCA language, etc.), a deployment file (e.g., HEAT, etc.), the software image, test scripts, policies, monitoring information and more.

A VNF vendor may provide their VNF directly to a CSP, but in a more likely scenario, the VNF vendor may submit a VNF to a certification vendor. The certification process is composed of multiple steps. As one example, the certification process of a VNF is described in U.S. patent application Ser. No. 15/222,844, titled "SYSTEM, METHOD, AND COMPUTER PROGRAM FOR AUTOMATICALLY CERTIFYING A VIRTUAL NETWORK FUNCTION (VNF) FOR USE IN A NETWORK FUNCTION VIRTUALIZATION (NFV) BASED COMMUNICATION NETWORK", filed Jul. 28, 2016, which is incorporated by reference herein.

At a high level, and relevant to the VNF integrity verification described herein, the certification process includes: a certification authority receiving the VNF from the VNF vendor; the certification authority performing multiple tests (e.g., functional, manageability, non-functional, etc.), and sending feedback to the VNF vendor; the VNF vendor updating the VNF and sending a new version of the VNF to the certification authority; any additional tests being performed by the certification authority; and as soon as the certification authority finishes the tests, the certification authority creating a certification (to approve that the VNF has undergone the certification process).

Figure 6:
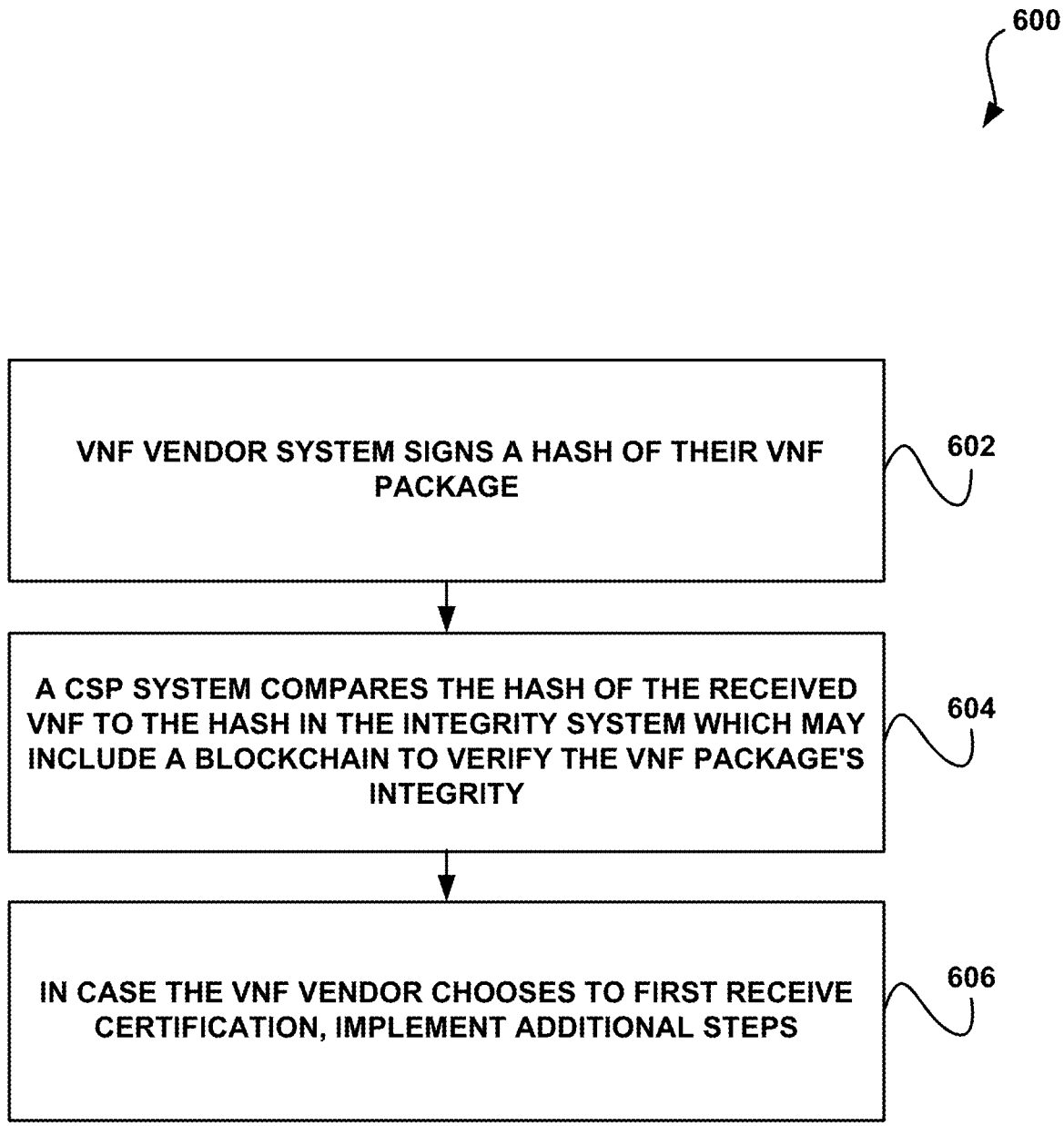
FIG. 6 illustrates a flow chart for utilization of blockchain for verifying VNF package and/or network service definition integrity, in accordance with one embodiment.

FIG. 6 illustrates a flow chart 600 for utilization of blockchain for VNF package and/or network service definition integrity verification, in accordance with one embodiment. As an option, the flow chart 600 may be viewed in the context of the details of the previous Figures. Of course, however, the flow chart 600 may be viewed in the context of any desired environment. Further, the aforementioned definitions may equally apply to the description below.

For utilization of blockchain for integrity, as a first step, a VNF vendor system signs a hash of their VNF package into an integrity system which may include a shared blockchain. See operation 602. As a second step, in case the VNF is provided directly to the CSP, a CSP system will compare the hash of the received VNF to the hash in the integrity system which may include a blockchain to verify the VNF package's integrity. See operation 604.

As a third step, in case the VNF vendor chooses to first receive certification, then additional steps are implemented. See operation 606. In this case, if a VNF Vendor provides their VNF directly to a CSP. Then, in each and every step in the certification process, namely the sending of the VNF from the vendor to the certification authority and back, when the VNF vendor sends a version of the VNF to the certification authority, the VNF vendor signs the VNF package in the integrity system (which may include a blockchain) and the certification authority verifies the integrity of the VNF package. In addition to the certificate that the certification authority creates, it is also records a hash or checksum of the certificate (and potentially the VNF package) in the blockchain. The certification authority has to indicate the specific version of the VNF package in the certificate so the CSP can check it in the verification process.

The certification authority can build a composition of VNFs or a service (i.e., a composition package). In such case, the certification authority has to provide the following to the CSP: the composition package; the certification of the composition, namely that the composition passed the certification process (functional, manageability, non-functional, etc.); and also sign the composition package in the integrity system, which may include a blockchain.

The CSP system can take the package, verify the certification, verify the package, and then be sure that the package was not been tampered with. The techniques described in FIG. 6 may be utilized to verify network service definitions also. Once the network service definitions are used by a system (e.g., an orchestrator, etc.) to generate a running network service, the integrity of the running network service may also be verified/maintained in an operational environment.

Figure 7:
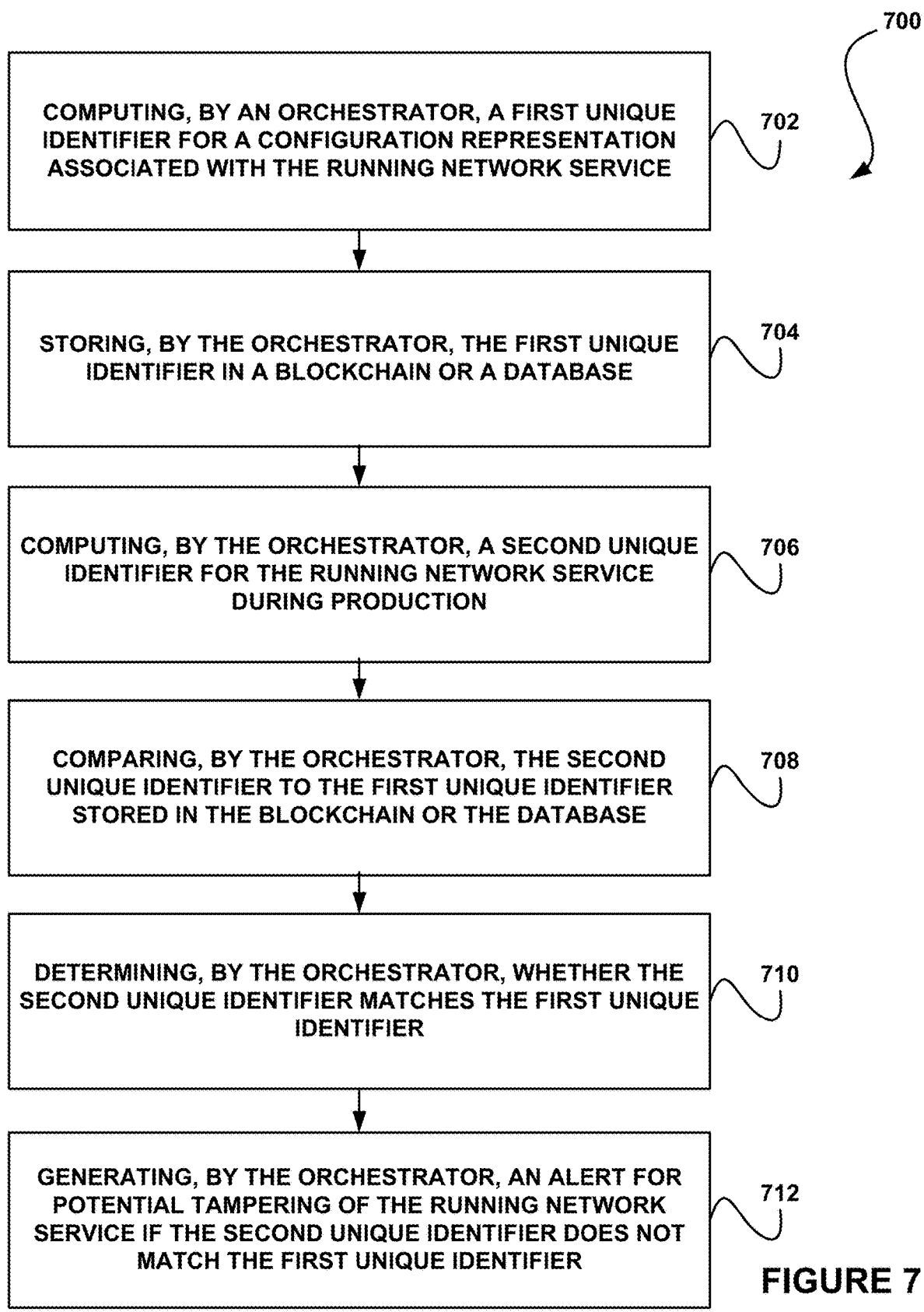
FIG. 7 illustrates a method for verifying the integrity of network services, in accordance with one embodiment.

FIG. 7 illustrates a method 700 for verifying the integrity of running network services, in accordance with one embodiment. As an option, the method 700 may be viewed in the context of the details of the previous Figures (e.g., the method 100 of FIG. 1, FIG. 6, etc.). Of course, however, the method 700 may be viewed in the context of any desired environment. Further, the aforementioned definitions may equally apply to the description below.

In use, a system (e.g., an orchestrator, etc.) computes a first unique identifier for a configuration representation associated with a running network service. See operation 702. The system stores the first unique identifier in a blockchain or a shared database. See operation 704. The system computes a second unique identifier for the running network service during production. See operation 106.

The system compares the second unique identifier to the first unique identifier stored in the blockchain or the database. See operation 708. The system determines whether the second unique identifier matches the first unique identifier. See operation 710. Furthermore, the system generates an alert for potential tampering of the network service if the second unique identifier does not match the first unique identifier. See operation 712.

Integrity of data assures that it has not been subject to unauthorized change. One technique for achieving integrity is to compare a piece of data to a previously stored copy of the data and to identify any changes. Instead of comparing the full piece of data, it is possible to calculate a unique identifier of the data.

Multiple techniques exist to make this calculation, including utilizing a checksum or hash. In this case, the checksum and hash are stored in a separate repository. At any given time, a checksum or hash of the data can be calculated and compared to the value stored in the repository. If the calculated and the stored values are identical, then no unauthorized changes have been made to the data since the time at which the checksum or hash was stored in the repository. The repository in which the checksum or hash is stored may be comprised of different systems. One implementation uses various forms of databases. Another implementation uses a blockchain.

Relying on a central database as a repository comes with challenges, but foremost among them is the security threat of a hacking attack. As long as at least one set of credentials exists to the database, it is possible for an unauthorized user to change the repository's data, thereby rendering the integrity check vulnerable.

A blockchain is a distributed method for storing data. Via consensus, new data is stored immutably. With no single point of failure, tampering with data becomes exceedingly difficult.

With respect to the system and solution described herein, a hash of a network service and its accompanying implementation files may be signed into a blockchain or database repository. When a service orchestrator seeks to use the network service in production, it can continually verify that the service has not been tampered by polling the blockchain or database repository with the network service's hash or checksum.

Figure 8:
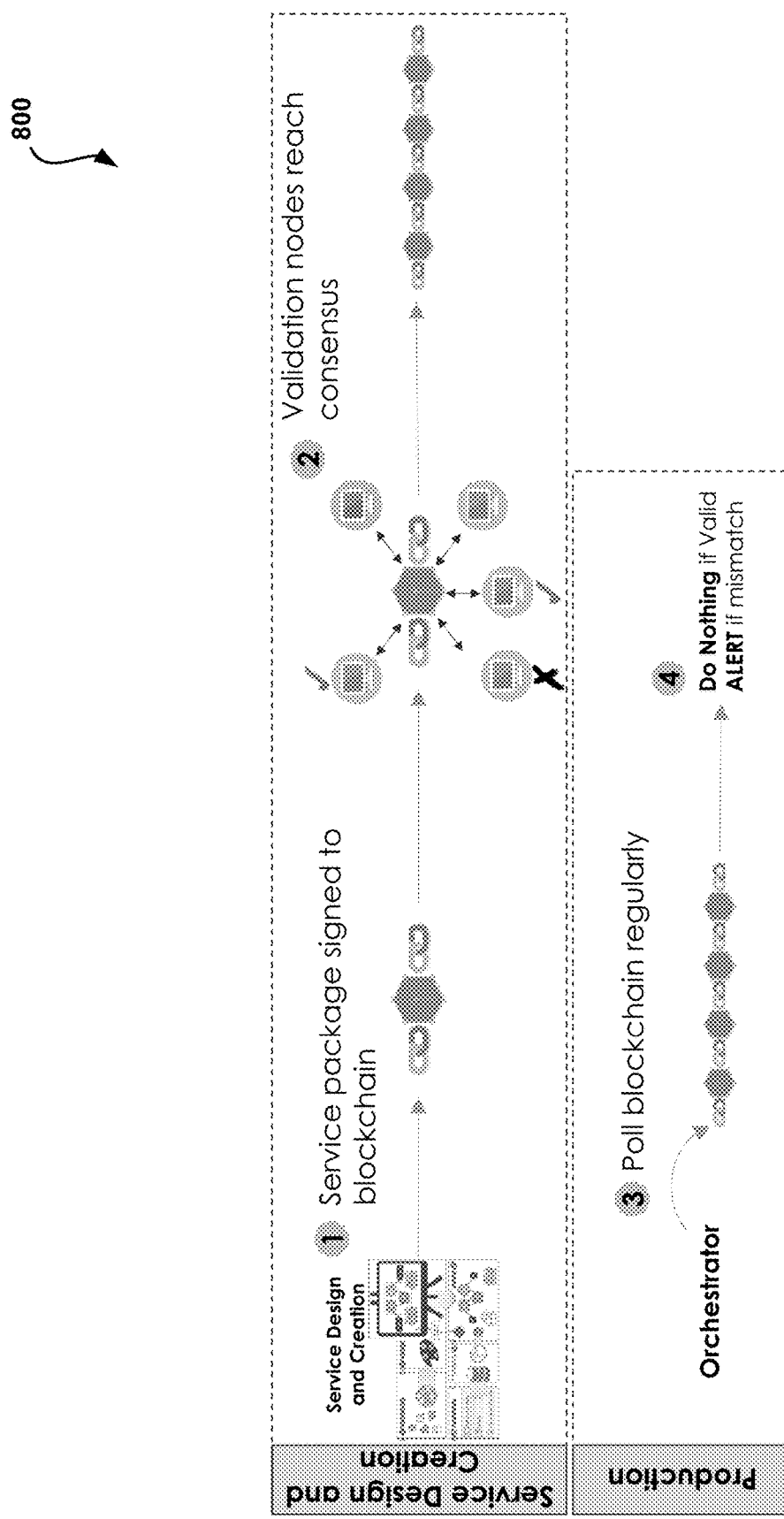
FIG. 8 illustrates a simplified block diagram of a system flow diagram for verifying the integrity of network services, in accordance with one embodiment.

FIG. 8 illustrates a simplified block diagram 800 of a system flow diagram for verifying the integrity of network services, in accordance with one embodiment. As an option, the block diagram 800 may be viewed in the context of the details of the previous Figures. Of course, however, the block diagram 800 may be viewed in the context of any desired environment. Further, the aforementioned definitions may equally apply to the description below.

In operation, a system completes service design and creation. More information about service design and creation may be found in U.S. Pat. No. 9,760,923, titled "SYSTEM, METHOD, AND COMPUTER PROGRAM FOR SERVICE DESIGN AND CREATION", filed Mar. 30, 2015, which is incorporated herein by reference.

The system creates a unique identifier for a service definition (e.g. which, in one embodiment, could be a cryptographic hash, checksum, etc.). The system saves the hash in a blockchain or a database. This unique identifier may be updated in production if the service is migrated, scaled, or subject to any other approved change.

Later, during production, the system calculates another unique identifier for the service in production. The system compares the unique identifier to that which was previously stored in the blockchain. If the identifiers are identical, the system may send an indication of such or do nothing. If the identifiers are different, the system creates an alert for potential tampering of the service.

Figure 9:
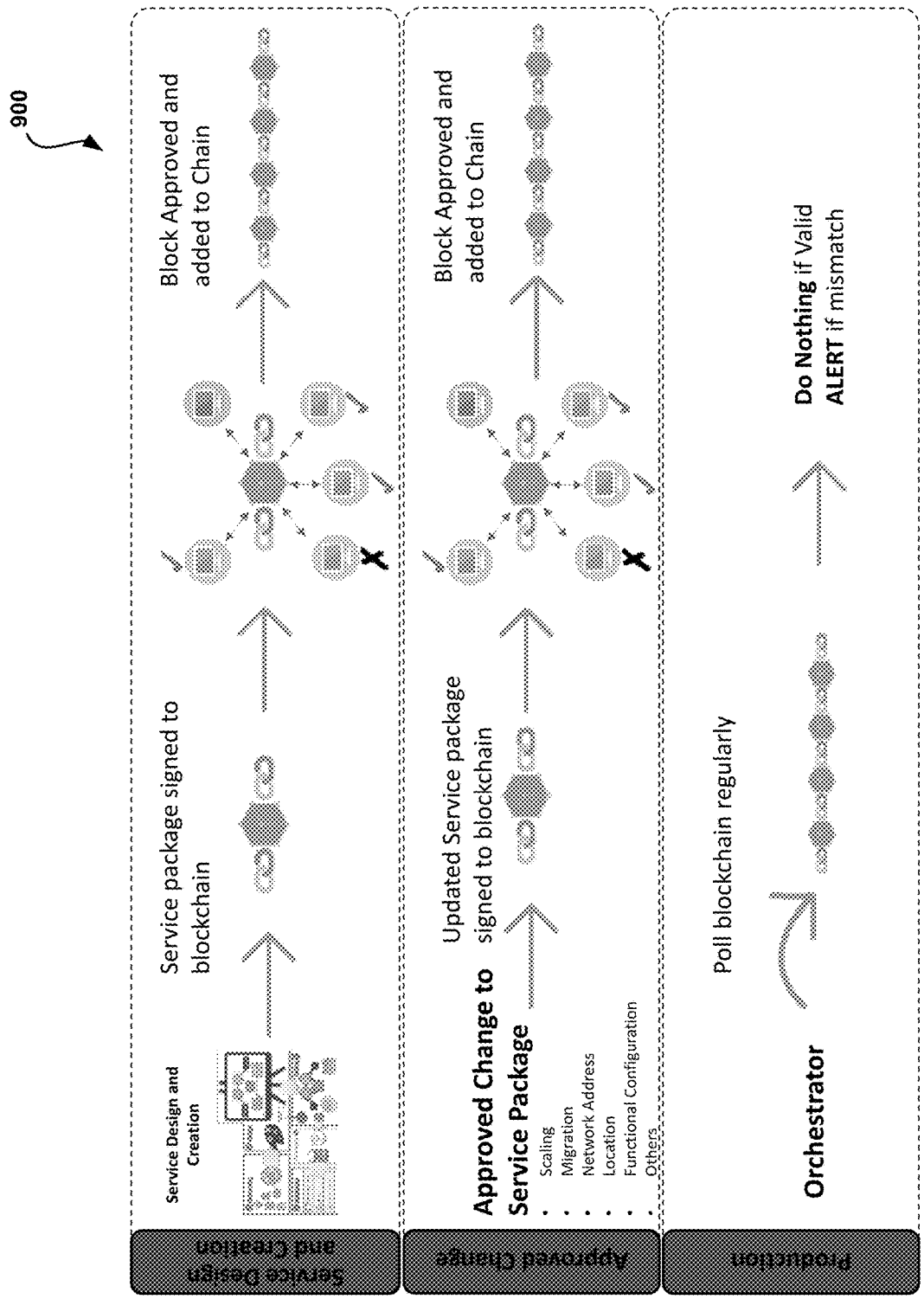
FIG. 9 illustrates a simplified block diagram of a system flow diagram for verifying the integrity of network services, in accordance with one embodiment.

FIG. 9 illustrates a simplified block diagram 900 of a system flow diagram for verifying the integrity of Network Services, in accordance with one embodiment. As an option, the block diagram 900 may be viewed in the context of the details of the previous Figures. Of course, however, the block diagram 900 may be viewed in the context of any desired environment. Further, the aforementioned definitions may equally apply to the description below.

In operation, a system completes service design and creation. The system creates a unique identifier for the service definition (e.g. which, in one embodiment, could be a cryptographic hash, checksum, etc.). The system saves the hash in a blockchain or a database. This unique identifier may be updated in production if the service is migrated, scaled, or subject to any other approved change.

Later, during production, the system calculates another unique identifier for the service in production. The system compares the unique identifier to that which was previously stored in the blockchain. If the identifiers are identical, the system may send an indication of such or do nothing. If the identifiers are different, the system creates an alert for potential tampering of the service.

The system may update and save the first unique identifier if the network service undergoes an approved change, such as one or more of migration, change of scaling, change of network address, change of location, change of functional configuration, and change of one or more policies.

FIG. 10 illustrates a simplified block diagram 1000 of a system flow diagram for verifying the integrity of VNF in which there are several different entities that are providing different levels of certifications, in accordance with one embodiment. As an option, the block diagram 1000 may be viewed in the context of the details of the previous Figures. Of course, however, the block diagram 1000 may be viewed in the context of any desired environment. Further, the aforementioned definitions may equally apply to the description below.

In one embodiment, the process of certifying a VNF may be built from several different certification tests. One test, for example, may be a functionality certification run by a functionality certifier, and another test may be a security test. Another test may be a runtime test and/or stress test, etc., based on the running VNF in a cloud test environment. Each test could be done by a different entity.

In FIG. 10, the VNF is distributed to three verifiers that perform four different tests. $Ver_1$ performs $Test_1$, $Ver_2$ performs $Test_2$, and $Ver_3$ performs $Test_3$ and $Test_4$. Each and every test is verified by the verifying entity and signed into the blockchain or the database. Each communication service provider could potentially define the different set of tests it requires. For example, $CSP_1$ could require only $Test_1$ and $Test_2$, and $CSP_2$ could require the complete set of all four tests. In order to verify the VNF, a CSP pulls the required set of signatures from the blockchain/database, and verifies them.

Figure 11:
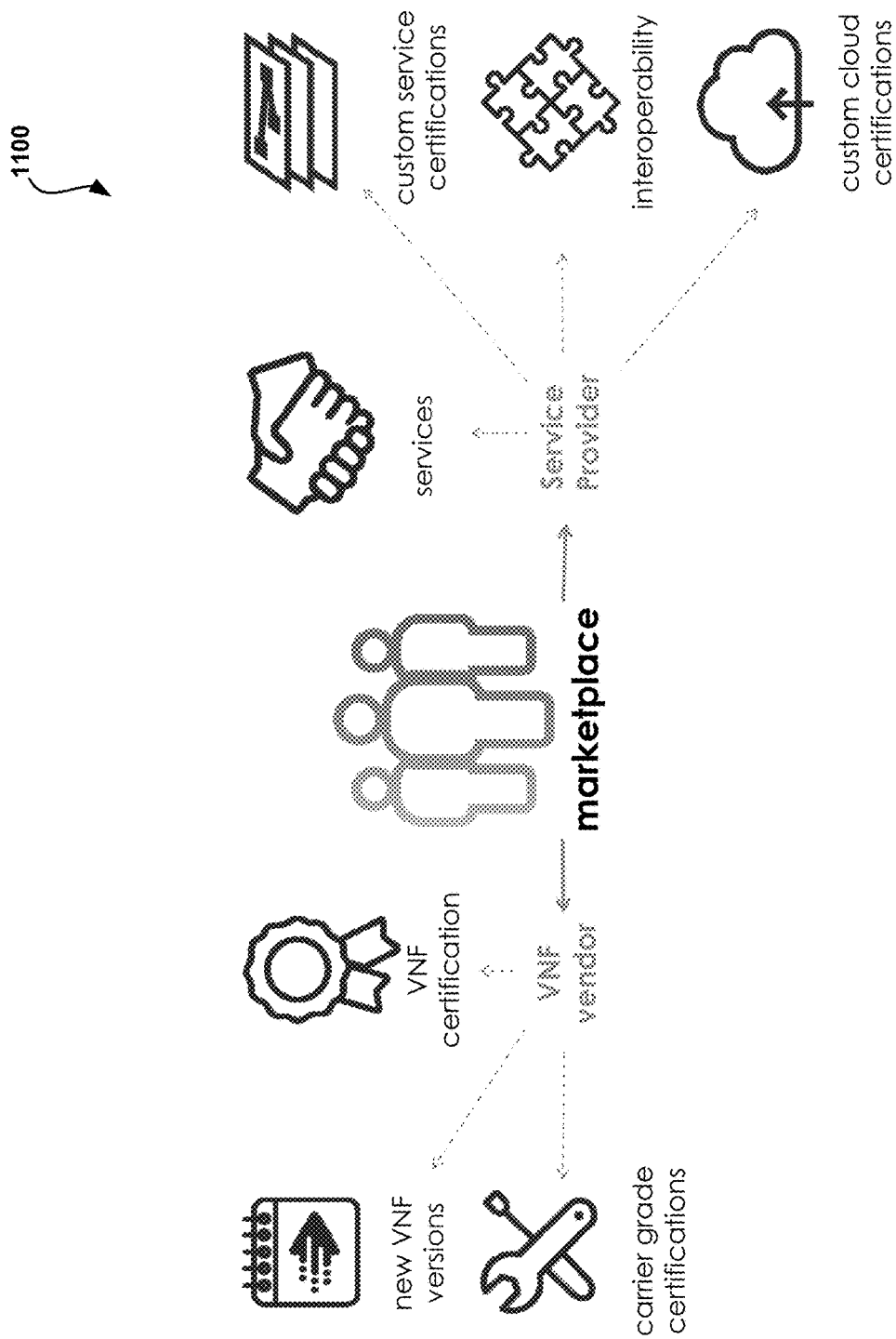
FIG. 11 illustrates a diagram showing entities that may be involved in a VNF verification process, in accordance with one embodiment.

FIG. 11 illustrates a diagram 1100 showing entities that may be involved in a VNF verification process, in accordance with one embodiment. As an option, the diagram 1100 may be viewed in the context of the details of the previous Figures. Of course, however, the diagram 1100 may be viewed in the context of any desired environment. Further, the aforementioned definitions may equally apply to the description below.

As shown, the entities in the VNF verification process may include VNF vendors and service providers for providing verified VNFs to the marketplace.

Figure 12:
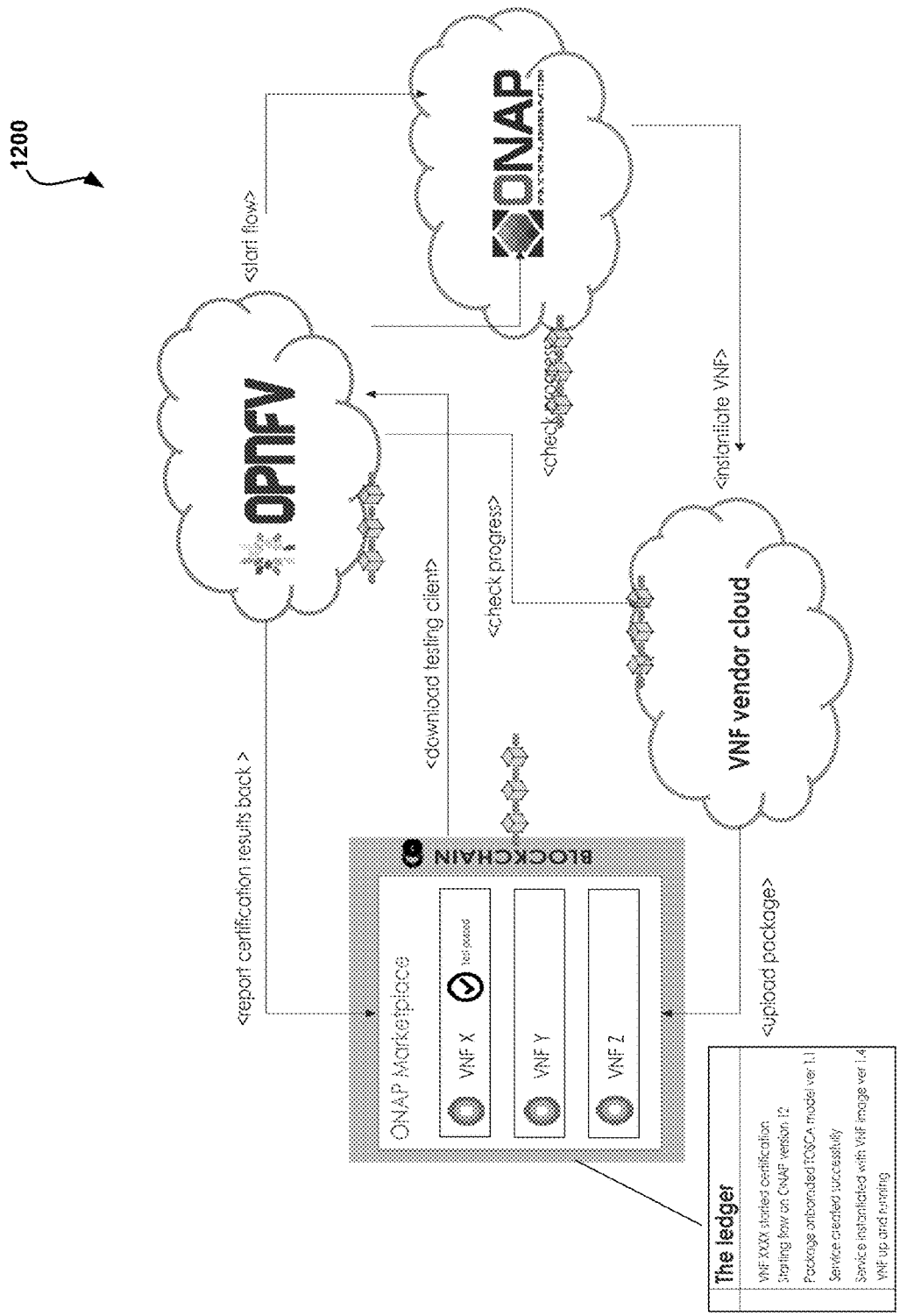
FIG. 12 illustrates a diagram showing a real world use case with real world entities for VNF certification, in accordance with one embodiment.

FIG. 12 illustrates a diagram 1200 showing VNF certification, in accordance with one embodiment. As an option, the diagram 1200 may be viewed in the context of the details of the previous Figures. Of course, however, the diagram 1200 may be viewed in the context of any desired environment. Further, the aforementioned definitions may equally apply to the description below.

As shown, the diagram shows a system including an ONAP marketplace system, a VNF vendor cloud, an ONAP instance, OPNFV's dovetail instance (i.e. a test client), and a test client provider. This system automates the process of VNF certification and testing by providing a tool for both vendors to test their VNF, using pre-defined rules and agreed test cases, a real orchestration (as being done by their customers, i.e. service providers), and for service providers, to test their VNF, as standalone entity, or within a context of a service.

This system may also provide a response to a trust issue identified between VNF vendors and service providers, as service providers would like to pass the VNF testing problem back to the VNF vendors, but cannot be certain that the VNF vendor will run everything the standard way. In addition, the service provider cannot be certain that the tests that are being executed are done on the same VNF package it owns and that there were no modifications to those artifacts.

The use case shown in FIG. 12 is based on a public marketplace, running on a public cloud, however private cloud solutions may be applied by the same concept. As shown, an ONAP marketplace is published on a public cloud, managed by the community or Linux foundation.

In operation, a VNF vendor packages a VNF into a pre-defined VNF package. This package may be described in ETSI GS VNF SOL 004 to verify all packages are aligned on a standard. The set of tools to build this package may be provided by the ONAP, through VNF SDK project in ONAP.

The VNF vendor will then upload its package to the ONAP marketplace. In various embodiments, the package may be immediately available to see by all, or may be available only for the VNF vendor until it is released.

Once the VNF package is available, the marketplace will create a blockchain that is signed by the VNF vendor and test client owner. They will sign on every operation, such as: VNF details (e.g. creation date, and modification date, image hash code (e.g. MD5), etc.); VNF test and result (e.g. identification of which test the VNF passed and the result and some hash code of the result file, etc.).

The testing client can then be downloaded from the test client provider. The test client provider is whoever can provide implementation to the test cases that will be defined in the community. Some of the test definitions, defined in the community, will be implemented in the community as well, but the assumption is that most of the test cases will remain un-implemented, and companies that will want to act as a test provider will be able to implement the community tests and provide it as a service. It is also a possibility that the community will define a set of authorized companies that can provide a test implementation.

The test client may have a configuration that will define the target cloud, target orchestrator, and target market place.

The target cloud is usually, in this use case, the VNF vendor cloud. This is where the VNF will be instantiated. It is reasonable to say that the testing environment for a specific vendor will be on its on cloud. Various security techniques may be utilized from the community marketplace to the targeted cloud environment.

The target orchestrator will usually be the ONAP instance that the test should run against. This of course can be a local deployment or a type of ONAP on the cloud that can be offered as a service to VNF vendors. In various embodiments, this may also be a deployment on different cloud environments, such as Openstack, AWS, etc.

The target marketplace may be, by default, public. This, however, may be a local implementation of the marketplace.

Once a configuration is in place, a test can be executed. This may start by downloading the VNF package from the marketplace, so it can be logged in the blockchain and can be verified at later stage. Tests will run on the target orchestration platform. Once tests are complete, results will be published back to the marketplace, where the blockchain will log those results, along with the hash code of the result file, that is attached to the record in the marketplace.

Figure 13:
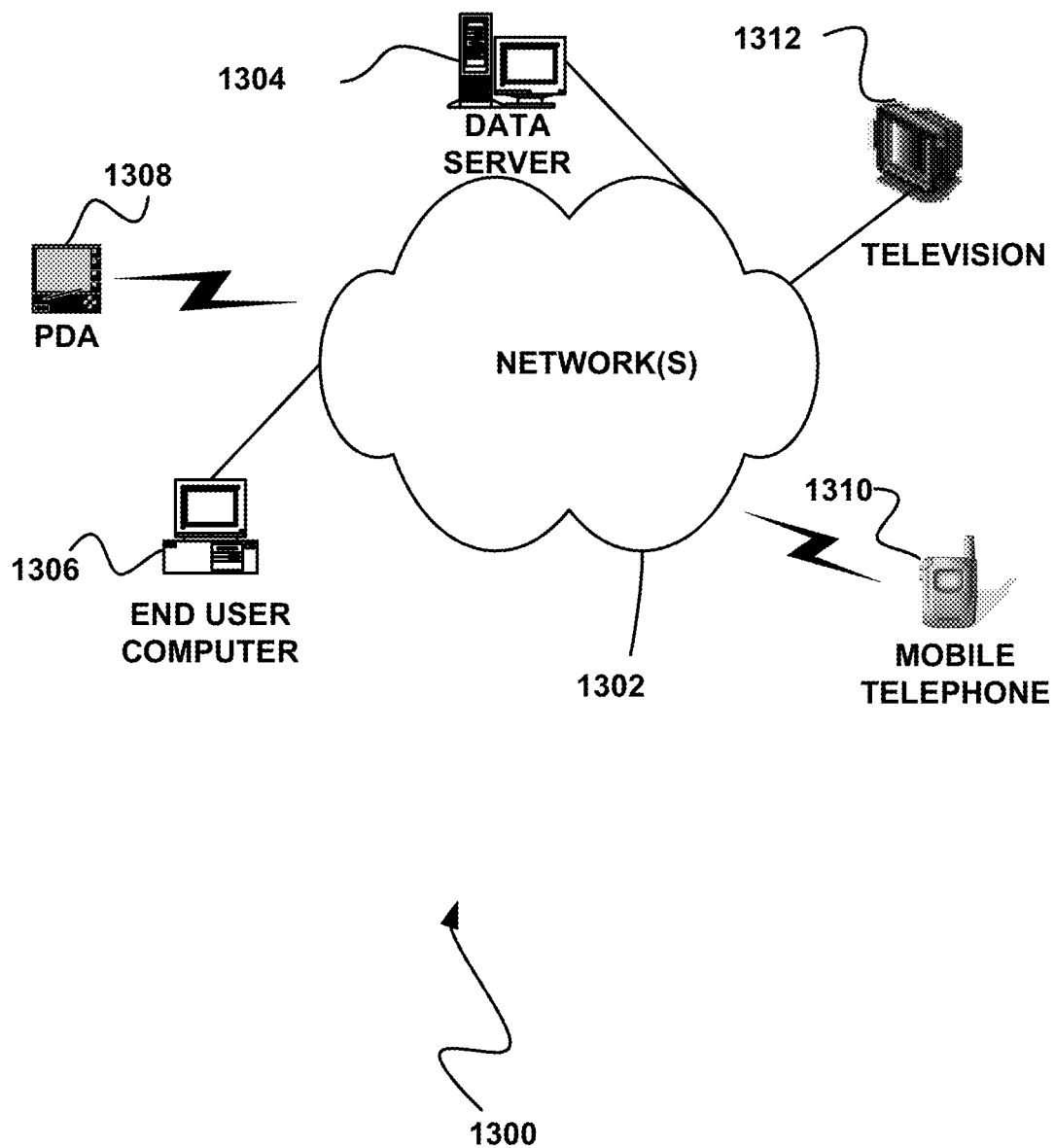
FIG. 13 illustrates a network architecture, in accordance with one possible embodiment.

FIG. 13 illustrates a network architecture 1300, in accordance with one possible embodiment. As shown, at least one network 1302 is provided. In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1304 and an end user computer 1306 may be coupled to the network 1302 for communication purposes. Such end user computer 1306 may include a desktop computer, lap-top computer, and/or any other type of logic. Still yet, various other devices may be coupled to the network 1302 including a personal digital assistant (PDA) device 1308, a mobile phone device 1310, a television 1312, etc.

Figure 14:
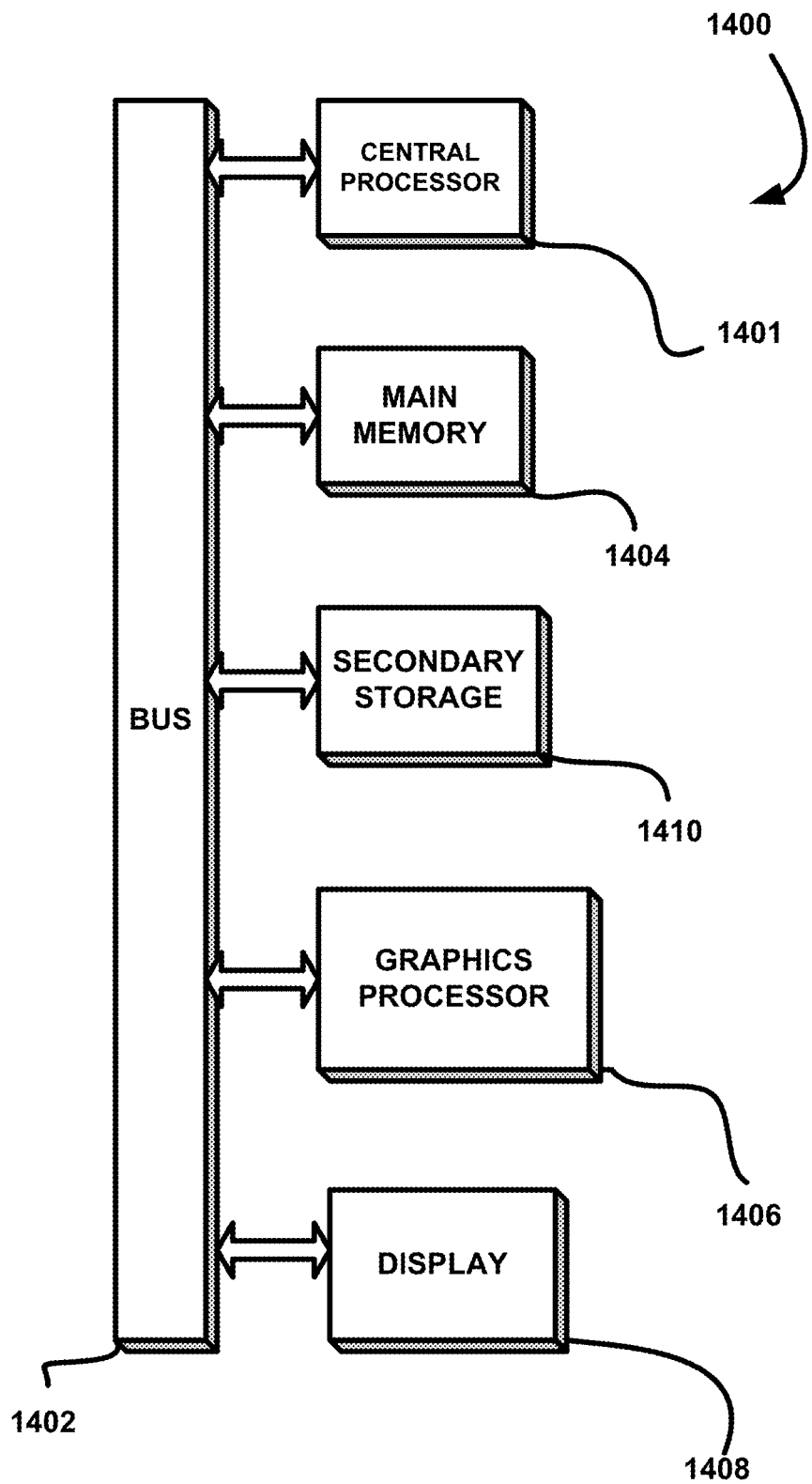
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. Of course, the system 1400 may be implemented in any desired environment.

As shown, a system 1400 is provided including at least one central processor 1401 which is connected to a communication bus 1402. The system 1400 also includes main memory 1404 [e.g. random access memory (RAM), etc.]. The system 1400 also includes a graphics processor 1406 and a display 1408.

The system 1400 may also include a secondary storage 1410. The secondary storage 1410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1404, the secondary storage 1410, and/or any other memory, for that matter. Such computer programs, when executed, enable the system 1400 to perform various functions (as set forth above, for example). Memory 1404, storage 1410 and/or any other storage are possible examples of tangible computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, a virtual network function (VNF) package or a network service definition for performing integrity verification;
   computing, by the system, a digital signature of the VNF package or the network service definition that allows verification of an integrity of the VNF package or the network service definition;
   storing, by the system, the digital signature in a blockchain; and
   providing, by the system, the VNF package or the network service definition to an entity that:
   accesses the digital signature of the VNF package or the network service definition from the blockchain,
   determines a second digital signature of the VNF package or the network service definition provided to the entity by the system,
   compares the digital signature of the VNF package or the network service definition accessed from the blockchain with the second digital signature of the VNF package or the network service definition provided to the entity by the system, and
   verifies the integrity of the VNF package or the network service definition when a result of the comparison indicates that the digital signature of the VNF package or the network service definition accessed from the blockchain matches the second digital signature of the VNF package or the network service definition provided to the entity by the system, wherein the entity verifies the integrity of the VNF package prior to using the VNF package to build a network service or verifies the integrity of the network service definition prior to using the network service definition to create a running network service.

2. The method of claim 1, wherein the system includes a plurality of entities each dedicated to performing a portion of the integrity verification.

3. The method of claim 1, wherein the system includes one entity dedicated to performing the integrity verification.

4. The method of claim 1, wherein a verified VNF package, resulting from the entity verifying the integrity of the VNF package, is added to a communication service provider (CSP) catalog.

5. The method of claim 4, wherein the system verifies that the verified VNF package in the CSP catalog is unchanged by verifying the digital signature of the VNF package in the blockchain.

6. The method of claim 1, wherein a verified network service definition, resulting from the entity verifying the integrity of the network service definition, is added to a CSP catalog.

7. The method of claim 6, wherein an orchestrator verifies that the verified network service definition in the CSP catalog is unchanged by verifying the digital signature of the network service definition in the blockchain when the orchestrator receives a request to run the network service definition.

8. The method of claim 7, wherein the orchestrator creates the running network service utilizing the verified network service definition.

9. The method of claim 8, further comprising:
computing, by the orchestrator, a first digital signature for a configuration representation associated with the running network service;
storing, by the orchestrator, the first digital signature in the blockchain;
computing, by the orchestrator, a second digital signature for the running network service during production;
comparing, by the orchestrator, the second digital signature to the first digital signature stored in the blockchain;
determining, by the orchestrator, whether the second digital signature matches the first digital signature; and
generating, by the orchestrator, an alert for potential tampering of the running network service if the second digital signature does not match the first digital signature.

10. The method of claim 9, further comprising updating and storing, by the orchestrator, the digital signature if the running network service undergoes an approved change.

11. The method of claim 10, wherein the approved change includes one or more of migration, change of scaling, change of network address, change of location, change of functional configuration, and change of one or more policies.

12. A non-transitory computer readable medium storing computer code executable by a computer processor to perform a method comprising:
identifying a virtual network function (VNF) package or a network service definition for performing integrity verification;
computing a digital signature of the VNF package or the network service definition that allows verification of an integrity of the VNF package or the network service definition;
storing the digital signature in a blockchain; and
providing the VNF package or the network service definition to an entity that:
accesses the digital signature of the VNF package or the network service definition from the blockchain,
determines a second digital signature of the VNF package or the network service definition provided to the entity by the system,
compares the digital signature of the VNF package or the network service definition accessed from the blockchain with the second digital signature of the VNF package or the network service definition provided to the entity by the system, and
verifies the integrity of the VNF package or the network service definition when a result of the comparison indicates that the digital signature of the VNF package or the network service definition accessed from the blockchain matches the second digital signature of the VNF package or the network service definition provided to the entity by the system,
wherein the entity verifies the integrity of the VNF package prior to using the VNF package to build a network service or verifies the integrity of the network service definition prior to using the network service definition to create a running network service.

13. A system, comprising:
memory storing computer instructions; and
one or more computer processors that execute the computer instructions to perform a method comprising:
identifying a virtual network function (VNF) package or a network service definition for performing integrity verification;
computing a digital signature of the VNF package or the network service definition that allows verification of an integrity of the VNF package or the network service definition;
storing the digital signature in a blockchain; and
providing the VNF package or the network service definition to an entity that:
accesses the digital signature of the VNF package or the network service definition from the blockchain,
determines a second digital signature of the VNF package or the network service definition provided to the entity by the system,
compares the digital signature of the VNF package or the network service definition accessed from the blockchain with the second digital signature of the VNF package or the network service definition provided to the entity by the system, and
verifies the integrity of the VNF package or the network service definition when a result of the comparison indicates that the digital signature of the VNF package or the network service definition accessed from the blockchain matches the second digital signature of the VNF package or the network service definition provided to the entity by the system,
wherein the entity verifies the integrity of the VNF package prior to using the VNF package to build a network service or verifies the integrity of the network service definition prior to using the network service definition to create a running network service.

14. The method of claim 1, wherein the digital signature is stored in the blockchain once accredited.

* * * * *